United States Patent [19]
Danneker

[11] Patent Number: 5,984,058
[45] Date of Patent: Nov. 16, 1999

[54] CUSHIONED BRAKING SYSTEM FOR A MONORAIL TROLLEY

[75] Inventor: Edward M. Danneker, Williamsport, Pa.

[73] Assignee: Playworld Systems, Inc., Lewisburg, Pa.

[21] Appl. No.: 09/226,547

[22] Filed: Jan. 7, 1999

Related U.S. Application Data

[62] Division of application No. 08/912,215, Aug. 15, 1997.

[51] Int. Cl.$^6$ .............................. F16F 5/00; B60R 19/32
[52] U.S. Cl. ........................... 188/312; 293/134; 293/30; 267/225
[58] Field of Search ............................ 267/225; 188/304, 188/312; 293/30, 134; 213/8, 43, 221

[56] References Cited

U.S. PATENT DOCUMENTS

| | | | |
|---|---|---|---|
| 291,495 | 1/1884 | Cloud | 104/256 |
| 309,689 | 12/1884 | Campbell | 104/63 |
| 399,283 | 3/1889 | Prittie | 104/113 |
| 446,905 | 2/1891 | Watriss et al. | 104/255 |
| 623,944 | 4/1899 | Carpenter | 104/130.08 |
| 630,577 | 8/1899 | Westmeyer | 104/254 |
| 836,995 | 11/1906 | Schroeder | 104/118 |
| 933,564 | 9/1909 | Hitch | 104/103 |
| 980,272 | 1/1911 | Ingersoll et al. | 104/249 |
| 988,382 | 4/1911 | Phelan | 267/225 |
| 1,041,680 | 10/1912 | Schilowsky | 105/141 |
| 1,061,035 | 5/1913 | Batcheller | 104/119 |
| 1,061,214 | 5/1913 | Batcheller | 104/119 |
| 1,262,108 | 4/1918 | Silver | 105/157.1 |
| 2,639,676 | 5/1953 | Travis et al. | 105/153 |
| 2,656,939 | 10/1953 | Peters | 213/223 |
| 2,851,716 | 9/1958 | Becker et al. | 104/119 |
| 2,992,815 | 7/1961 | Ellis | 267/225 |
| 3,004,499 | 10/1961 | Straight et al. | 104/249 |
| 3,070,035 | 12/1962 | Russo et al. | 104/113 |
| 3,075,476 | 1/1963 | Penn et al. | 104/256 |
| 3,110,367 | 11/1963 | Roberts | 188/287 |
| 3,131,921 | 5/1964 | Karbowniczek | 267/128 |
| 3,158,232 | 11/1964 | Doetsch et al. | 188/312 |
| 3,232,443 | 2/1966 | Smith | 213/8 |

(List continued on next page.)

FOREIGN PATENT DOCUMENTS

| | | | |
|---|---|---|---|
| 1149905 | 10/1959 | France | 267/150 |
| 296563 | 2/1917 | Germany . | |
| 2437557 | 2/1976 | Germany | 104/113 |

OTHER PUBLICATIONS

A.O. Smith Corp., *Cushion Ride Cushioned Underframes 20 Inches of Travel* 1963).
Keystone Railway Equipment Co., *Keystone Shock Control Protects Cars & Lading.*
Playworld Systems, *Playgrounds and Park Equipment Catalog* 67 (1996).

*Primary Examiner*—Chris Schwartz
*Attorney, Agent, or Firm*—Seidel, Gonda, Lavorgna & Monaco, PC

[57] ABSTRACT

A cushioned braking system for cushioning the impact of a moving vehicle for amusement for children is disclosed. The braking system comprises a double ended air cylinder having a first cylinder end and a second cylinder end. A first head member and a second head member close the first and second cylinder ends, respectively. A first piston rod extends axially outward from the cylinder through the first head member. A first piston is on the first piston rod within the cylinder. A second piston rod extends axially outward from the cylinder through the second head member. A second piston is on the second piston rod within the cylinder. A spring assembly resiliently connects the first piston to the second piston within the cylinder. The spring assembly serves to bias the first and second pistons toward a reference position. The cylinder also has a vent for controlling air flow within the cylinder. Contact between a piston rod and a stop causes said piston rod to be forced axially into the cylinder, thereby partially compressing the air in the cylinder and compressing the spring assembly. The spring assembly serves to bias the rod axially outward after the spring assembly has been compressed.

8 Claims, 5 Drawing Sheets

U.S. PATENT DOCUMENTS

| | | | |
|---|---|---|---|
| 3,306,233 | 2/1967 | Saxonmeyer | 104/249 |
| 3,362,742 | 1/1968 | Sanderson | 293/134 |
| 3,369,674 | 2/1968 | Carle | 213/43 |
| 3,437,053 | 4/1969 | Bush et al. | 104/119 |
| 3,437,054 | 4/1969 | Bishop | 104/178 |
| 3,490,607 | 1/1970 | Shafer | 213/43 |
| 3,575,454 | 4/1971 | Meeker | 293/62 |
| 3,722,428 | 3/1973 | Alexandrov et al. | 105/365 |
| 3,754,513 | 8/1973 | Snyder et al. | 104/256 |
| 3,759,558 | 9/1973 | Komatsu | 293/30 |
| 3,866,539 | 2/1975 | Gasser | 104/249 |
| 4,177,735 | 12/1979 | Rydin | 104/254 |
| 4,591,031 | 5/1986 | Kilst | 188/287 |
| 4,768,627 | 9/1988 | Taylor | 188/280 |
| 5,142,992 | 9/1992 | Long, Jr. | 104/251 |
| 5,638,755 | 6/1997 | Love et al. | 104/126 |
| 5,746,335 | 5/1998 | Brough et al. | 213/43 |

CUSHIONED BRAKING SYSTEM FOR A MONORAIL TROLLEY

This is a divisional of copending application Ser. No. 08/912,215 filed on Aug. 15, 1997.

FIELD OF THE INVENTION

The present invention relates generally to cushioned braking systems, and more particularly to a cushioned braking system for a monorail trolley for use in a playground monorail system.

BACKGROUND OF THE INVENTION

Suspended vehicles of the monorail trolley-type and others are known. The idea of being suspended in mid-air while moving along a track or cable predates the development of monorail technology. Most commonly, adults and children have found amusement in securing a rope or cable across a body of water, suspending themselves from a movable device attached to the rope or cable, sliding part way across the body of water, and then dropping from the device into the water.

Monorail systems also exist where the monorail trolley is intended to travel the full distance of the track. The trolley is usually stopped more or less abruptly after making contact with a stop located at each end of the track.

Monorail systems of this type have practical use in playground systems for the amusement of children. However, when the trolley makes contact with the stop, a child suspended from the trolley is likely to suffer significant injury if the trolley is stopped abruptly. Furthermore, since children often play together, there would be a likelihood that the child holding on to the trolley would be propelled into the stop by other children on the playground. Thus, the child holding onto the trolley could be significantly harmed by falling off the trolley and landing incorrectly, or by being catapulted off the trolley into a support structure or other children playing nearby.

In monorail systems for children, where a child holds on to the trolley until it reaches a stop, there is a need for a braking system which cushions the impact of the trolley to prevent undue harm to the child. The invention provides such a cushioned braking system.

SUMMARY OF THE INVENTION

The present invention relates to a monorail system with a cushioned braking system for amusement for children. The monorail system comprises a monorail trolley, a track for guiding the monorail trolley along a path, support structure for elevating the track, a first stop for stopping the monorail trolley in one direction of travel along the track, a second stop for stopping the monorail trolley in an opposite direction of travel along the track, and a cushioned braking system engageable with the first stop for decelerating the trolley when the monorail trolley is traveling in said one direction and engageable with the second stop for decelerating the trolley when the monorail trolley is traveling in said opposite direction.

In a preferred embodiment, the cushioned braking system comprises a double ended air cylinder having a first cylinder end and a second cylinder end. A first head member closes the first cylinder end, and a second head member closes the second cylinder end. A first piston rod extends axially outward from the cylinder through the first head member. A first piston is located on the first piston rod within the cylinder. A second piston rod extends axially outward from the cylinder through the second head member, and a second piston is located on the second piston rod within the cylinder. A spring assembly resiliently connects the first piston to the second piston within the cylinder. The spring assembly serves to bias the first and second pistons toward a reference position. Vent means are provided for controlling air flow within the cylinder. The cushioned braking system is carried by the monorail trolley. The first piston rod is aligned to engage the first stop in said one direction of travel along the track, and the second piston rod is aligned to engage the second stop in said opposite direction of travel along the track.

In another preferred embodiment, the first and second head members of the cylinder each have at least one air inlet orifice, and the first piston rod is substantially hollow and has at least one air discharge orifice for venting air from within the cylinder.

The monorail trolley preferably has a top portion comprising means for supporting the cushioned braking system, at least one wheel for rolling movement along the track, and a handle depending from a bottom portion of the trolley. In another preferred embodiment, the monorail trolley further comprises a plurality of wheels and a plurality of axles. Each axle has two ends extending longitudinally through the trolley. At least one wheel is attached to each end of each axle.

A purpose of the cushioned braking system is to provide a cushioned halt of the trolley as the trolley engages a stop in either direction of travel. As the trolley approaches either end of the monorail extrusion, one of the piston rods contacts a stop. The stop begins to exert a force on the rod to oppose the force exerted by the momentum of the trolley. The piston attached to the rod begins to move inside the cylinder and incurs resistance by the air inside. The piston also acts against a spring assembly. The total force required to bring the trolley to a complete stop is gradually exerted by the stop on the rod, piston, spring assembly, and air within the cylinder. The spring assembly then relaxes and restores the piston and rod to a reference position.

The present invention further comprehends a track in the form of a substantially hollow extrusion having a first end and a second end. The first stop is located at the first end, and the second stop is located at the second end. The first stop and the second stop each comprise a member extending transversely across said path. In another preferred embodiment, the first stop and the second stop each comprise an end cap which is attached to a flange located at each end of the extrusion.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE INVENTION

Figure 1:
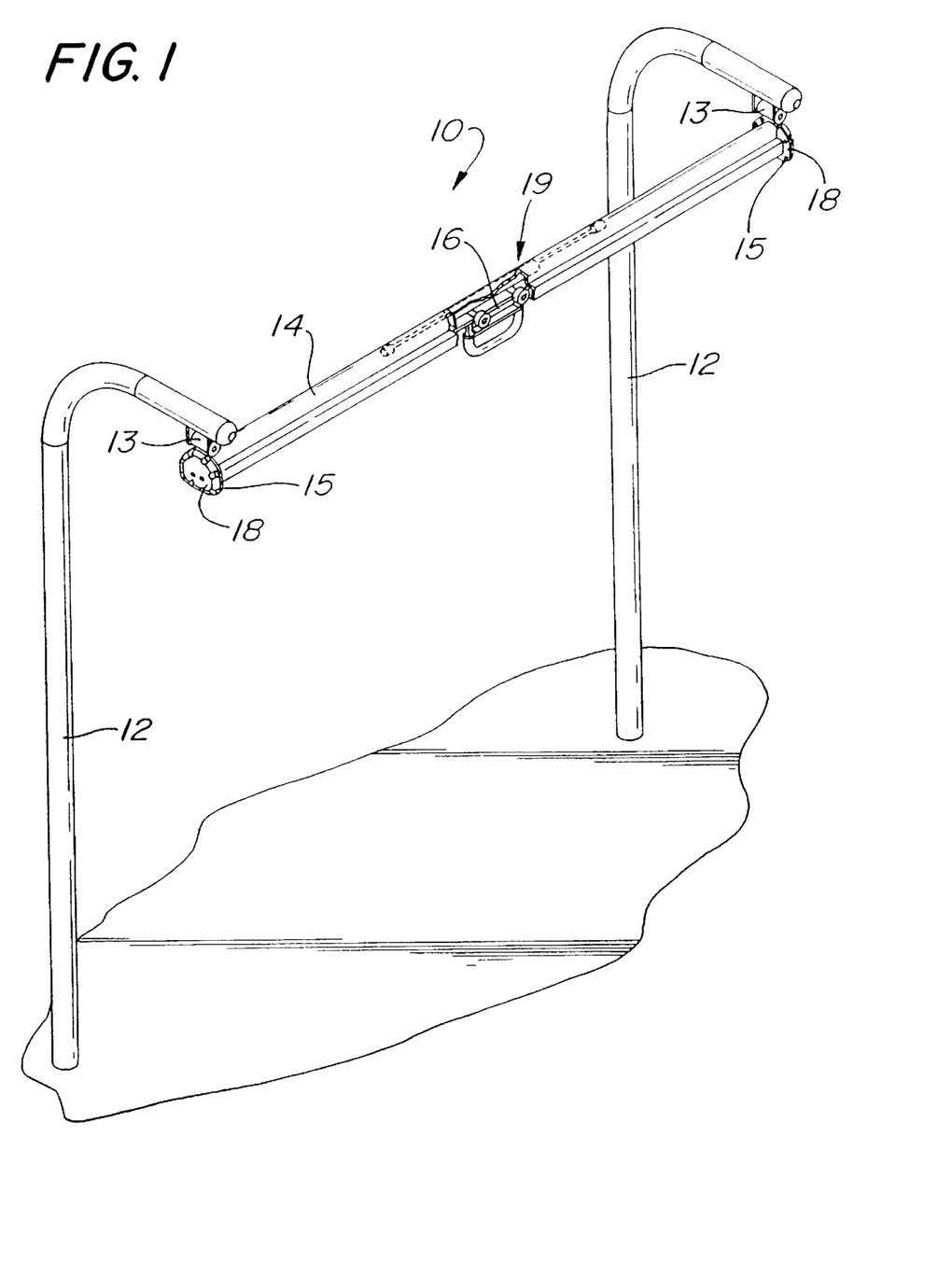
FIG. 1 is a perspective view of a monorail system according to one embodiment of the invention.

Referring to the drawings, wherein like numerals indicate like elements, there is shown in FIG. 1 a monorail system 10 comprising a substantially hollow extrusion 14 with a flange 15 at each end, a pair of overhead support members 12, and a monorail trolley 16 with cushioned braking system 19, according to the invention.

The monorail trolley 16 is movable along the extrusion 14, which defines a track. Each end of the extrusion 14 is sealed by an end cap 18 which is attached to the flanges 15 at the ends of the extrusion 14. Also attached to each end cap is an extrusion hanger 13 which extends upward from each end cap 18, and is connected to an overhead support member 12. The overhead support members 12 suspend the extrusion at a desired height.

Figure 2:
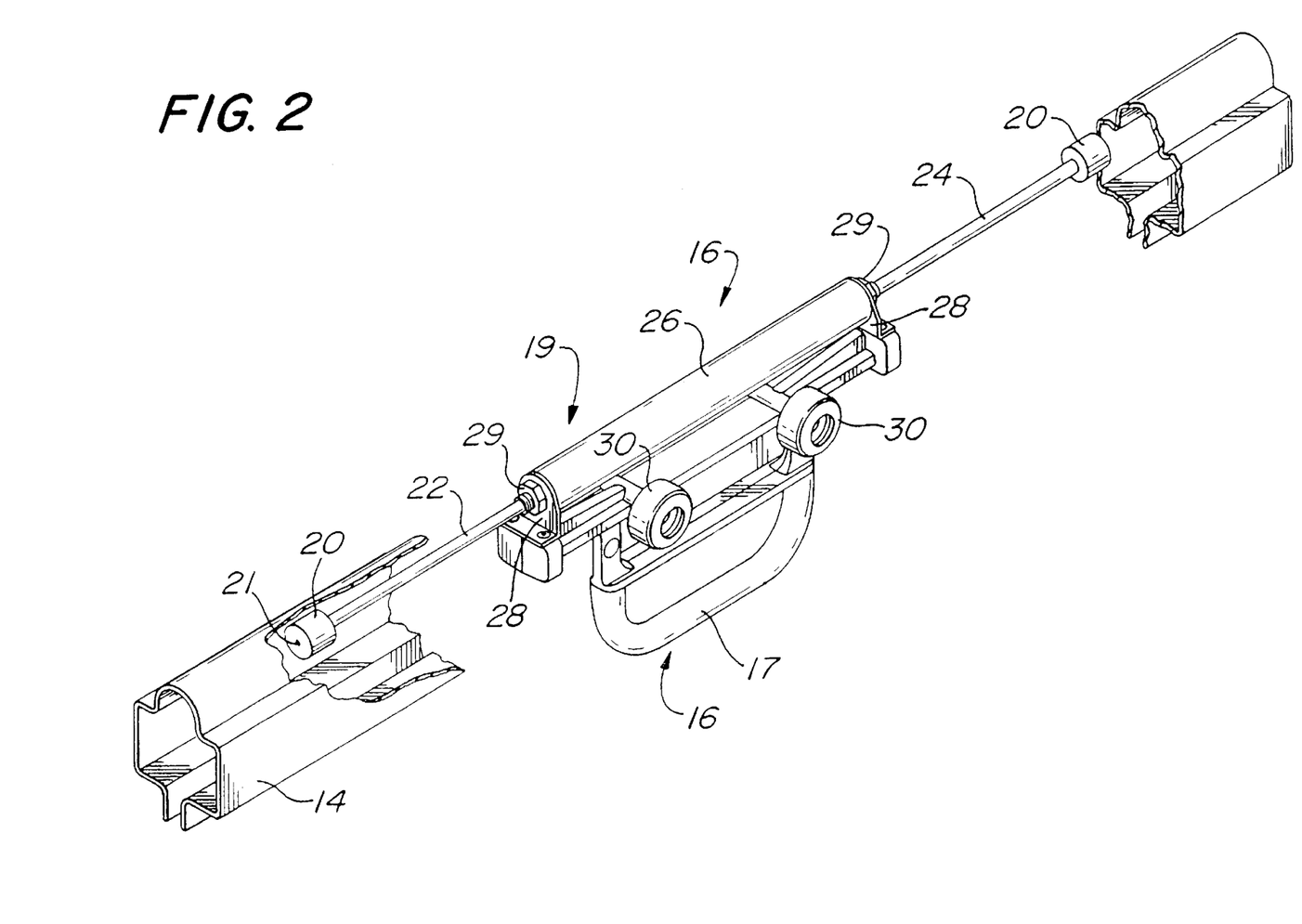
FIG. 2 is a perspective view of the monorail system of FIG. 1, showing a fragmentary view of the extrusion and the monorail trolley located partially inside the extrusion.

FIG. 2 is a perspective view of the monorail system of FIG. 1, showing a fragmentary view of the extrusion 14 and the monorail trolley 16 located partially inside the extrusion 14. Cushioned braking system 19 is carried by the monorail trolley 16 and, like trolley 16, is located inside the extrusion 14. A cylinder mounting bracket 28 extends upward from each end of a top portion of the trolley 16 and secures a double ended air cylinder 26 to the trolley 16. Two pair of wheels 30 contact the interior horizontal bottom surface of the extrusion 14 for rolling movement along the extrusion 14.

Figure 3:
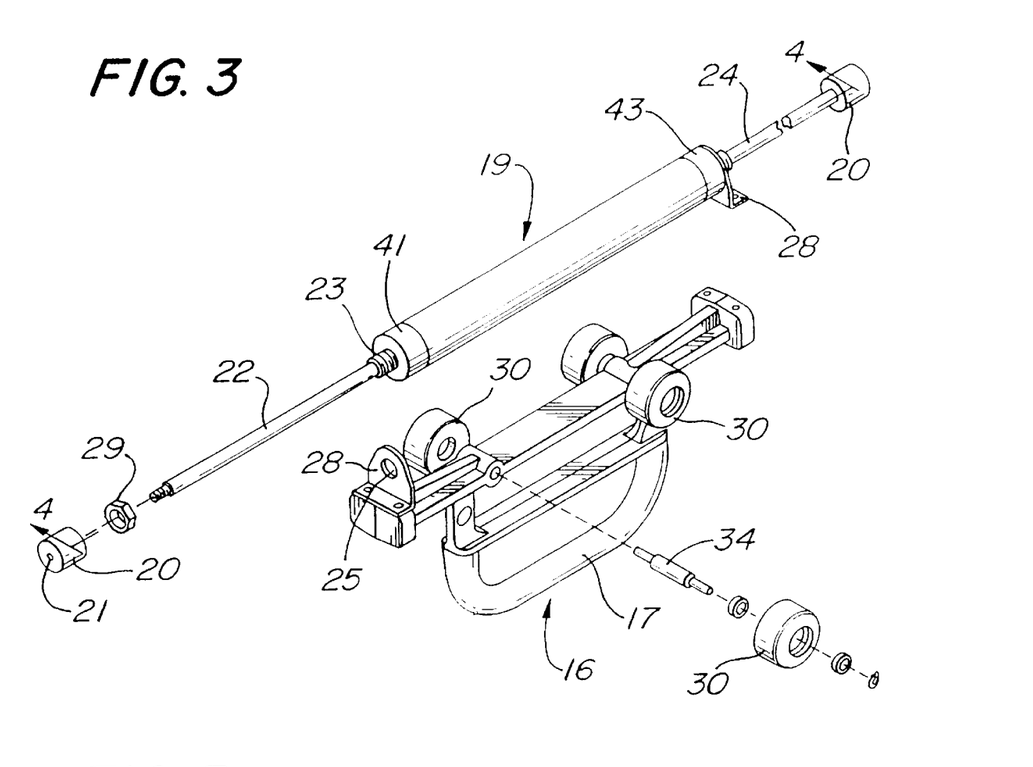
FIG. 3 is an exploded view of the monorail trolley of FIG. 2.

FIG. 3 is an exploded view of the monorail trolley 16 with cushioned braking system 19 of FIG. 2. The cylinder 26 of the cushioned braking system 19 is attached to the trolley 16 using a pair of cylinder mounting brackets, as shown in FIG. 2. Each cylinder mounting bracket 28 has a perforation 25 to allow a threaded nipple 23 of a first head member 41, and a threaded nipple 23 of a second head member 43, to pass through the perforation 25 in each of the cylinder mounting brackets 28. A pair of cylinder mounting nuts 29 threadedly engage each of the threaded nipples 23, firmly seating the cylinder mounting brackets 28 against each of the first head member 41 and the second head member 43.

A pair of axles 34 each having two ends extend longitudinally through the trolley 16. A wheel 30 is attached to each end of each axle 34. A handle 17 depends from the bottom portion of the trolley 16. A rubber cushion 20 is threadedly engaged to each of a first piston rod 22 and a second piston rod 24.

Figure 4:
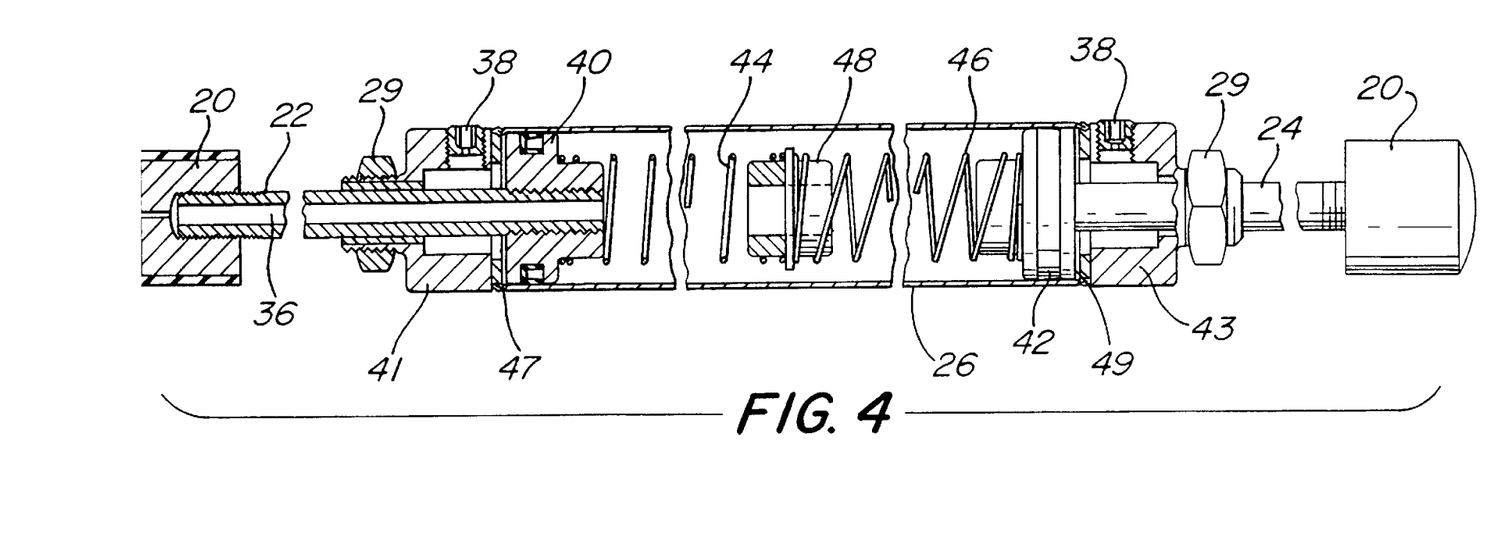
FIG. 4 is a schematic representation of the cushioned braking system, in section, showing the structure of the cushioned braking system in more detail.

FIG. 4 is a schematic representation of the cushioned braking system 19, in section, showing the structure of the cushioned braking system in more detail. In a preferred embodiment, the cushioned braking system 19 comprises a double ended air cylinder 26 having a first cylinder end 47 and a second cylinder end 49. A first head member 41 closes the first cylinder end 47, and a second head member 43 closes the second cylinder end 49. A substantially hollow first piston rod 22 extends axially outward from the cylinder 26 through the first head member 41. A first piston 40 is located on the first piston rod 22 within the cylinder 26. A second piston rod 24 extends axially outward from the cylinder 26 through the second head member 43, and a second piston 42 is located on the second piston rod 24 within the cylinder 26. A spring assembly resiliently connects the first piston 40 to the second piston 42 within the cylinder 26. The spring assembly comprises a first spring 44 attached at a first end to the first piston 40, a second spring 46 attached at a first end to the second piston 42, and a spacer 48 connecting said first and second springs at respective second ends thereof.

The first head member 41 and second head member 43 of the cylinder 26 each have an air inlet orifice 38. The substantially hollow portion 36 of the first piston rod 22 communicates air within the cylinder 26 to an air discharge orifice 21. The air discharge orifice 21 is a perforation in the rubber cushion 20.

Figure 5:
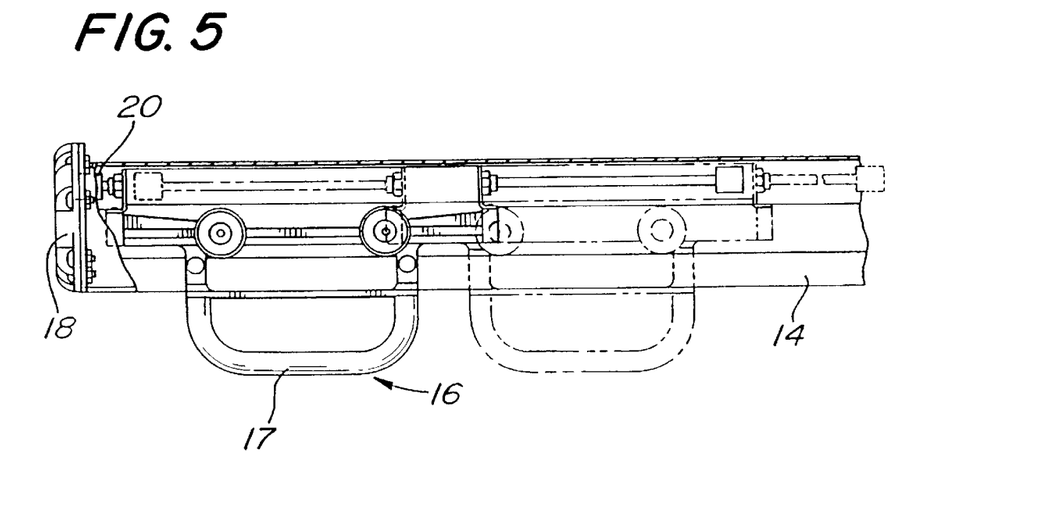
FIG. 5 is an elevation view of the monorail trolley of FIG. 2, showing, in phantom, the state of the trolley before it engages an end cap, and showing, in solid line, the state of the trolley after the first piston rod is forced axially into the cylinder of the cushioned braking system.

FIG. 5 shows, in phantom, the state of the trolley 16 before it engages an end cap 18, and shows, in solid line, the state of the trolley 16 after the first piston rod 22 is forced axially into the cylinder 26 of the cushioned braking system 19. The first piston rod 22 is aligned to engage an end cap 18 in one direction of travel along the track. Contact between the first piston rod 22 and the end cap 18 causes the first piston rod 22 to be forced axially into the cylinder 26, thereby compressing the air in the cylinder 26 and compressing the first spring 44 and the second spring 46. The first spring 44, second spring 46, and spacer 48 bias the rod axially outward after the springs have been compressed and the moving vehicle has been braked to a halt.

Figure 6:
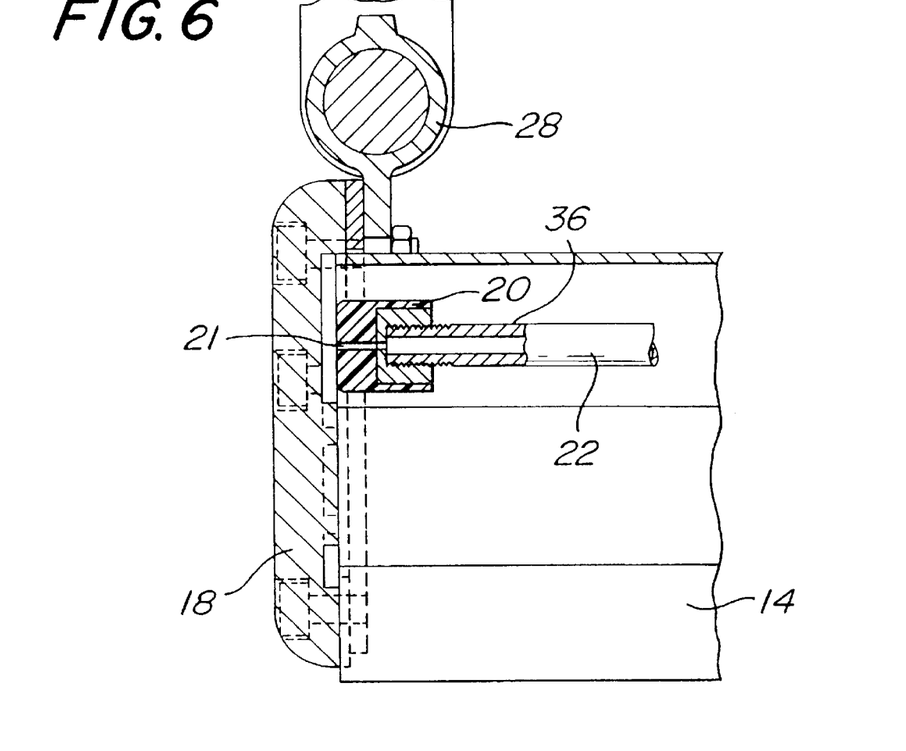
FIGS. 6 is an enlarged view of a portion of FIG. 5 showing a rubber cushion on the first piston rod engaging an end cap.
Figure 7:
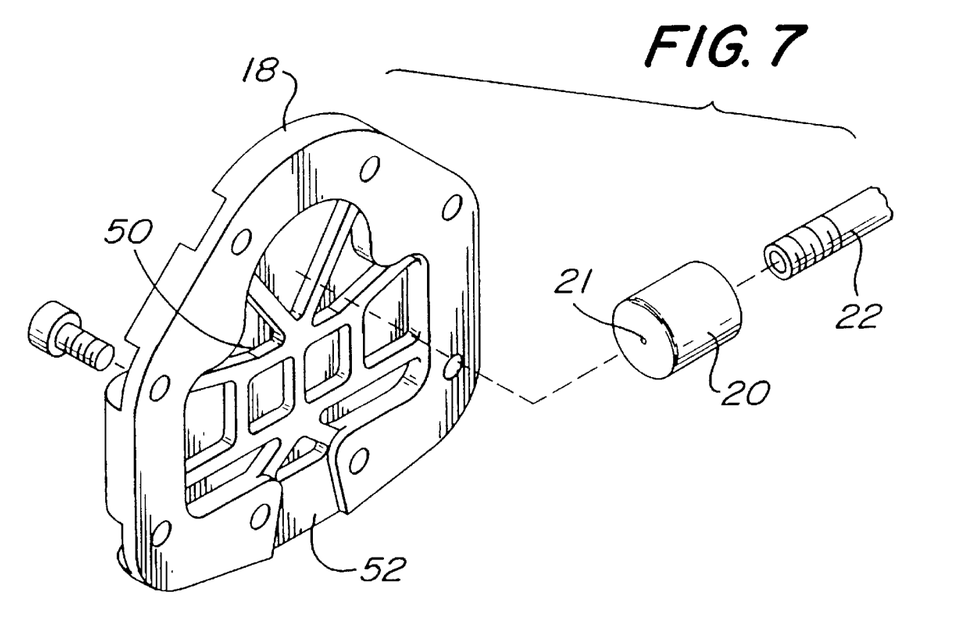
FIG. 7 is a perspective view of an end cap showing a matrix of ribs extending outward from the end cap, and an opening in the end cap for venting air.

FIGS. 6 is an elevation view of the rubber cushion 20 on the first piston rod 22 engaging an end cap 18. FIG. 7 is a perspective view of an end cap showing a matrix of ribs 50 extending outward from the end cap 18. The rubber cushion 20 engages the matrix of ribs 50 without blocking the air discharge orifice 21 in the rubber cushion 20. As the first piston rod 22 is forced axially into the cylinder 26, the compressed air in the cylinder 26 moves through the substantially hollow portion 36 of the first piston rod 22 to the air discharge orifice 21. The air discharge orifice vents the air into the end cap 18. An opening 52 in the end cap 18 vents the air.

It is contemplated that any suitable support may be used to elevate the track according to the invention. A substantially inverted L-shaped support is one preferred embodiment. Other support structures contemplated by the invention include inverted U-shaped members, V-shaped members, similar to a support structure of a standard playground swing set, and T-shaped members. The invention further contemplates support structures mounted above the track to a wooden joist, a ceiling, or other suitable object or objects. According to the invention, any material possessing properties of strength suitable to support the track and at least one child can be used as a support.

In a preferred embodiment, the monorail hanger 13 is attached to the extrusion 14 using screws. However, any suitable bracket, mold, brace, pedestal, or stubshaft may be used to fasten, attach or secure the track to the support, according to the invention. The support may incorporate a mold for mounting the track. The end cap 18, or similar stop, may incorporate a mold or a brace for fastening to the support.

In a preferred embodiment, the track is an extrusion 14 having a flange 15 at each end. The invention contemplates any suitable track to support the monorail trolley 16, such as, a partially closed track with lips or grooves suitable to contain the trolley 16 as it moves along the track. A preferred material for the track is 6061-T6 aluminum, but any suitable material such as stainless steel is provided for by the invention. A preferred material for the flanges 15 is Almag aluminum alloy. However, any suitable material of similar strength, such as stainless steel is contemplated by the invention.

In a preferred embodiment, end caps 18 for stopping the trolley 16 seal the ends of the extrusion 14. However, any stop, such as a screw, bolt, block of wood, metal or plastic, or piece of rubber may be used to halt the trolley according to the invention. The stop can be fastened to the track by any suitable hardware or by press fitting, or can be partially or completely detached from the track according to the invention.

In a preferred embodiment each end cap 18 has a matrix of ribs 50 extending outward from the end cap 18. The invention contemplates any suitable stop such as an end cap 18 capable of stopping the trolley 16 without blocking the outward flow of air from within the cylinder 26. A bumper attached to an end cap 18 made of a resilient material such as urethane is a stop according to the invention.

In a preferred embodiment, the trolley 16 is molded of Almag aluminum. The trolley may be molded by any suitable material such as a similar aluminum alloy, high strength plastic, or stainless steel according to the invention. A handle 17 which is U-shaped and extends parallel to the track is in a preferred embodiment of the invention. The handle 17 may be molded or attached to the trolley 16 according to the invention. The trolley 16 can have any suitable handle parallel with, perpendicular to or rotatable on the trolley 16, such as a tee, rope, finger, cable, or other geometrically shaped member, according to the invention.

In a preferred embodiment, a wheel 30 is attached to the ends of a pair of axles 34 for rolling movement along the track. The invention contemplates use of at least one wheel 30. The wheel or wheels may be attached to the trolley 16 in any suitable manner, such as molding or welding a piece of material to an axis of the wheel 30 and press fitting the material into a bore in the trolley 16, or mounting a wheel 30 to a shaft attached to the trolley 30, according to the invention.

In a preferred embodiment, the cushioned braking system 19 is attached to the trolley 16 using a pair of cylinder mounting brackets 28. The invention contemplates any suitable instrumentality for mounting the cushioned braking system 19 on the trolley 16, such as clips attached to the cylinder 26 or the trolley 16, molded structures incorporated into the cylinder 26 or trolley 16, and any other bracket or brace which is capable of securing the cushioned braking system 19 to the trolley 16. The instrumentalities for mounting the cushioned braking system 19 on the trolley 16 may be made of any suitable material having the requisite strength to withstand the force which results from impact of the trolley 16 as it engages a stop, such as galvanized steel.

The cylinder 26, first head member 41, and second head member 43, may be made of any suitable material capable of withstanding environmental effects and the force exerted on them when the air is compressed in the cylinder 26, such as stainless steel, a high strength aluminum alloy and high strength plastic, according to the invention.

In a preferred embodiment, compressed air in the cylinder 26 moves through the substantially hollow portion 36 of the first piston rod 22 to the air discharge orifice 21. According to the invention the first piston rod 22, the second piston rod 24, or both the first piston rod 22 and the second piston rod 24 may be substantially hollow. The invention contemplates venting the air through any suitable port, such as perforations in the first piston rod 22, perforations in the second piston rod 24, perforations in the cylinder, and perforations in the rubber cushion 20. The rubber cushion 20 may be any suitable material, such as neoprene with a solid steel core.

In a preferred embodiment, the spring assembly is a first spring 44 attached at a first end to the first piston 40, a second spring 46 attached at a first end to the second piston 42, and a spacer 48 connecting said first and second springs at respective second ends thereof. The invention comprehends any suitable spring assembly, such as a single spring connecting the first piston 40 to the second piston 42, or a plurality of springs connecting the first piston 40 to the second piston 42.

The present invention may be embodied in other specific forms without departing from the spirit or essential attributes thereof and, accordingly, reference should be made to the appended claims, rather than to the foregoing specification, as indicating the scope of the invention.

I claim:

1. A cushioned braking system for cushioning the impact of a moving vehicle for amusement for children comprising:
    a double ended air cylinder having a first cylinder end and a second cylinder end;
    a first head member closing the first cylinder end;
    a second head member closing the second cylinder end;
    a first piston rod extending axially outward from the cylinder through the first head member;
    a first piston on the first piston rod within the cylinder;
    a second piston rod extending axially outward from the cylinder through the second head member;
    a second piston on the second piston rod within the cylinder;
    a spring assembly resiliently connecting the first piston to the second piston within the cylinder, the spring assembly biasing the first and second pistons toward a reference position; and
    vent means for controlling air flow within the cylinder; the cushioned braking system adapted to be carried by the moving vehicle.

2. The monorail trolley of claim 1, wherein the spring assembly comprises a first spring attached at a first end to the first piston, a second spring attached at a first end to the second piston, and a spacer connecting said first and second springs at respective ends thereof.

3. The cushioned braking system of claim 1, wherein: the first and second head members of the cylinder each have at least one air inlet orifice; and
    the first piston rod is substantially hollow and has at least one air discharge orifice for venting air from within the cylinder.

4. The cushioned braking system of claim 3, wherein the spring assembly comprises a first spring attached at a first end to the first piston, a second spring attached at a first end to the second piston, and a spacer connecting said first and second springs at respective ends thereof.

5. A cushioned braking system for cushioning the impact of a moving vehicle for amusement for children comprising:
    a double ended air cylinder having a first cylinder end and a second cylinder end;
    a first head member closing the first cylinder end;
    a second head member closing the second cylinder end;
    a first piston rod extending axially outward from the cylinder through the first head member;

a first piston on the first piston rod within the cylinder;

a second piston rod extending axially outward from the cylinder through the second head member;

a second piston on the second piston rod within the cylinder;

a spring assembly resiliently connecting the first piston to the second piston within the cylinder, the spring assembly biasing the first and second pistons toward a reference position; and vent means for controlling air flow within the cylinder; wherein contact between a piston rod and a stop causes said piston rod to be forced axially into the cylinder, thereby compressing the air in the cylinder and compressing the spring, the spring assembly biasing the rod axially outward after the spring has been compressed and the moving vehicle has been braked to a halt.

6. The cushioned braking system of claim 5, wherein: the first and second head members of the cylinder each have at least one air inlet orifice; and the first piston rod is substantially hollow and has at least one air discharge orifice for venting air from within the cylinder.

7. The cushioned braking system of claim 5, wherein the spring assembly comprises a first spring attached at a first end to the first piston, a second spring attached at a first end to the second piston, and a spacer connecting said first and second springs at respective ends thereof.

8. The cushioned braking system of claim 6, wherein the spring assembly comprises a first spring attached at a first end to the first piston, a second spring attached at a first end to the second piston, and a spacer connecting said first and second springs at respective ends thereof.

* * * * *